US011951502B2

(12) United States Patent
Henderson

(10) Patent No.: US 11,951,502 B2
(45) Date of Patent: Apr. 9, 2024

(54) SPRAY HEAD WITH RADIALLY SEPARABLE SEGMENTS

(71) Applicant: Labman Automation Limited, Middlesborough (GB)

(72) Inventor: Stephen Carl Henderson, Middlesborough (GB)

(73) Assignee: Labman Automation Limited, Middlesborough (GB)

( * ) Notice: Subject to any disclaimer, the term of this patent is extended or adjusted under 35 U.S.C. 154(b) by 270 days.

(21) Appl. No.: 17/298,419

(22) PCT Filed: Nov. 29, 2019

(86) PCT No.: PCT/GB2019/053396
§ 371 (c)(1),
(2) Date: May 28, 2021

(87) PCT Pub. No.: WO2020/109826
PCT Pub. Date: Jun. 4, 2020

(65) Prior Publication Data
US 2022/0088628 A1 Mar. 24, 2022

(30) Foreign Application Priority Data
Nov. 30, 2018 (GB) ..................................... 1819581

(51) Int. Cl.
*B05B 7/02* (2006.01)
*B05B 7/06* (2006.01)
(Continued)

(52) U.S. Cl.
CPC .............. *B05B 7/025* (2013.01); *B05B 7/066* (2013.01); *B05B 7/0815* (2013.01);
(Continued)

(58) Field of Classification Search
CPC ......... B05B 7/025; B05B 15/70; B05B 15/50; B05B 7/066; B05B 7/0815; B05B 7/2467; B05B 7/2472
(Continued)

(56) References Cited

U.S. PATENT DOCUMENTS 2,344,936 A * 3/1944 Zink ..................... F23D 17/002 239/545
7,484,676 B2 2/2009 Joseph et al.
(Continued)

FOREIGN PATENT DOCUMENTS

CA 2976853 A1 2/2019
DE 3409961 A1 9/1985
(Continued)

OTHER PUBLICATIONS

International Search Report and Written Opinion issued for PCT/GB2019/053396, dated Mar. 3, 2020, 14 pages.
(Continued)

*Primary Examiner* — Christopher S Kim
(74) *Attorney, Agent, or Firm* — Bochner PLLC; Andrew D. Bochner

(57) ABSTRACT

A spray head for atomising fluid ejected from a fluid conduit, the spray head comprising: a body having a longitudinal bore for receiving the fluid conduit such that a distal tip of the fluid conduit extends to a distal end of the longitudinal bore, the body being configured to direct a balanced flow of gaseous medium over the distal tip of the fluid conduit, when received within the longitudinal bore, so as to promote atomisation of the fluid as it is ejected from the distal tip of the fluid conduit, wherein the body comprises at least two radially separable segments, each of which defines part of the longitudinal bore, said at least two segments when combined forming said body having a longitudinal bore,
(Continued)

whereby the fluid conduit is received within the longitudinal bore by locating said at least two segments around the fluid conduit.

19 Claims, 9 Drawing Sheets

(51) Int. Cl.

| | |
|---|---|
| ***B05B 7/08*** | (2006.01) |
| ***B05B 7/24*** | (2006.01) |
| ***B05B 15/50*** | (2018.01) |
| ***B05B 15/70*** | (2018.01) |

(52) U.S. Cl.
CPC .......... *B05B 7/2467* (2013.01); *B05B 7/2472* (2013.01); *B05B 15/50* (2018.02); *B05B 15/70* (2018.02)

(58) Field of Classification Search
USPC ............. 239/422, 423, 424, 424.5, 428, 600
See application file for complete search history.

(56) References Cited

U.S. PATENT DOCUMENTS

| | | | |
|---|---|---|---|
| 8,899,501 | B2 | 12/2014 | Fox et al. |
| 9,782,784 | B2 | 10/2017 | Schmon et al. |
| 2008/0012159 | A1 | 1/2008 | Schmid et al. |
| 2018/0050357 | A1 | 2/2018 | Delsard |

FOREIGN PATENT DOCUMENTS

| | | | |
|---|---|---|---|
| DE | 102004027789 | A1 | 2/2005 |
| WO | 2004037432 | A1 | 5/2004 |
| WO | 2005102538 | A1 | 11/2005 |

OTHER PUBLICATIONS

Search and Examination Report issued for GB1917504.1, dated May 11, 2020, 5 pages.

* cited by examiner

SPRAY HEAD WITH RADIALLY SEPARABLE SEGMENTS

FIELD OF THE INVENTION

The present invention relates to devices for spraying fluids, such as paint and varnish, which typically use compressed air to atomise the spray fluid as it is ejected from the spray head. More specifically, the invention relates to an improved spray head for such devices.

BACKGROUND

Devices for spraying fluids of one form or another are now ubiquitous. Their key features were invented in stages; Joseph Binks first applied fluid pressure to whitewash a Chicago basement in 1887; and, in 1907, Thomas DeVilbiss observed that paint is drawn up and atomised from the end of a pickup tube in a controlled manner when air is blown across it.

Although better results can be achieved with the DeVilbiss® style of spray painting, it consumes large amounts of energy. In 1980, legislation was introduced to limit the air pressure in an effort to improve the poor paint transfer efficiency, but even modern HVLP (high volume, low pressure) spray guns still require industrial sized compressors.

Energy aside, solvents or VOCs (volatile organic compounds) are also consumed on an industrial scale and, other than the small amount used to thin the paint for spraying, most is typically used flushing the paint lines and cleaning the spray gun assembly. Although new water-based paint systems are being adopted, their application still requires a spray gun typically based on the above two founding principles, air atomisation and/or pressure feed (airless).

A process often referred to as "air-assist" combines these two atomisation processes with the effect of improving the transfer efficiency while generally maintaining the application quality. The air-assist process also significantly extends the range of fluids that can be processed and is favoured for more viscous fluids like varnish. In each of the above processes the fluid flows from a reservoir, through pipe work and internal ducting on its way out of the spray head.

Most known spray guns typically utilise a spray head that primarily comprises a fluid tip and an air cap, which are held together by a cylindrical collar screwed onto the spray gun, whereby the fluid tip is fluidly connected with a fluid reservoir via a needle valve assembly in the spray gun, which controls the flow of fluid from the fluid reservoir to the fluid tip. After each spray application, the air cap, fluid tip, needle valve assembly, pipe work and fluid reservoir must all be cleaned thoroughly before the fluid dries.

Notably in the research and development of new coatings (e.g. paints, lacquers and varnishes) test spraying of small quantities of fluid onto small test panels is repeated many times. This task requires a disproportionate amount of cleaning, generates unnecessary waste, and is very time consuming. Cleaning is a particular challenge in the field of automated high throughput experimentation (HTE) and testing where hundreds of different paints may be sprayed per day.

DE3409961A1 describes how, in place of fluid feed lines or fluid reservoirs, a range of interchangeable "syringe-like" cartridges may be used to contain the fluid. A fluid conduit in the form of a nozzle attached to the cartridge provides a continuous fluid conduit for the fluid to flow through and a nozzle tip may be placed on the nozzle for insertion into a spray head. In this example, during assembly, the nozzle is inserted axially into the spray head along a central bore of the spray head so that the fluid, when forced by a piston in the cartridge, is ejected from the tip of the nozzle into an airstream (e.g. compressed air) that is separately channelled out through the spray head, which atomises the fluid.

EP0359846A1 describes a contactless drawing instrument in which a tube pen is axially located in a housing adapted for concentric alignment with an air nozzle. The drawing tube extends beyond the end face of the tubular guide, and through the bore of the spray nozzle such that an annular gap (or passage) is created between the bore of the spray nozzle and the outer diameter of the drawing tube through which atomising air can flow. This system relies on vacuum pressure generated by the flow of air through the annular gap and past the end of the drawing tube to pull the fluid from a fluid reservoir. It is also known that, for small siphon feed systems like this, the atomisation of the fluid preferably starts inside the bore of the spray nozzle, and that for larger gravity feed and pressure feed systems the quality of the sprayed surface finish is improved if atomisation is initiated down-stream at the end of the bore, either flush with the outer face of the spray nozzle or externally projecting beyond the outer face of the spray nozzle.

WO2005/102538A1 describes a device for spraying fluids, which utilises a fluid conduit in the form of a cannula that is fluidly connected to a fluid reservoir, whereby an end tip of the cannula extends through a central bore of a spray head. Fluid is driven through the cannula from the fluid reservoir by movement of a piston in the fluid reservoir. The fluid is ejected from the tip of the cannula into an airstream channelled out through separate openings in the spray head, thereby atomising the fluid. The disclosure focuses on the benefits of using an interchangeable fluid reservoir and cannula for quick change of spray fluids, thereby reducing the need for extensive cleaning of wetted segments such as a fluid tip and needle valve assembly.

In such devices, when replacing the fluid reservoir, the cannula must be moved in and out of (i.e. inserted through) the central longitudinal bore of the spray head, which has close mechanical tolerances relative to the cannula, both before and after spraying. Such movement will inevitably deposit and smear drips of spray fluid in the bore of the spray head in the process. As little as a few tens of microns of paint residue on the cannula or in the bore can result in non-uniform atomisation of the fluid and a badly distorted spray pattern, thereby negating the benefits claimed by the above systems.

The aim of the present invention is to provide an improved spray head that addresses the above-described problems.

STATEMENT OF INVENTION

Described herein is a spray head for atomising fluid ejected from a fluid conduit, the spray head comprising: a body having a longitudinal bore for receiving a fluid conduit such that a distal tip of the fluid conduit extends to a distal end of the longitudinal bore, the body being configured to direct a balanced flow of gaseous medium over the distal tip of the fluid conduit, when received within the longitudinal bore, so as to promote atomisation of the fluid as it is ejected from the distal tip of the fluid conduit, wherein the body comprises at least two radially separable segments, each of which defines part of the longitudinal bore, said at least two segments when combined forming said body having a longitudinal bore, whereby the fluid conduit is received within the longitudinal bore by locating said at least two segments around the fluid conduit.

To avoid having to insert the fluid conduit axially through the bore of the spray head, the present invention splits the body into two or more (i.e. "at least two") radially separable segments, which combine precisely to form a single body, and which direct the air flow past the tip of the fluid conduit. Another advantage is that by assembling the body around the (shaft of) the fluid conduit, the extent to which the fluid conduit protrudes from the front face of the spray head can be controlled directly by the fluid conduit rather than by the position of a fluid reservoir attached to the fluid conduit, for example.

As used herein, the term "radially separable" preferably connotes that the body segments (of the spray head) are configured to have a radial component to their direction of separation (and hence of course, assembly). The direction of separation does not have to be perpendicular to the longitudinal axis of the body, however, as the segments could be secured from an oblique angle, for example. Importantly, the at least two segments are configured to be radially separable such that the body (and hence its central bore) can be assembled around the sides of the fluid conduit, which thereby avoids the need to insert a fluid conduit through the body or the bore that extends there through. As such, the body of the spray head is, in use, formed (or "assembled") around a fluid conduit.

The spray head may be used with a fluid conduit in any suitable configuration, including a tube, needle, pipe, cannula, shaft, duct, spout, conical nozzle, or similar fluid conduit, each of which are in (or adapted to be in) fluid communication with a cartridge, syringe, reservoir, feed line, or similar supply of fluid (or liquid) for atomisation.

Air (or any other suitable "gaseous medium") flowed through the spray head atomises the fluid emerging from the tip of the fluid conduit and can also be used to shape the spray. It is important that the air is balanced around the tip of the fluid conduit and shaping flows of the spray head to produce a stable spray.

The spray head disclosed herein (which may be referred to as a "split" spray head or "air cap") further simplifies inspection and cleaning in the event that the bore should become dirty. Furthermore, as the fluid conduit does not have to be inserted through the bore during assembly, its tip can advantageously be bent, profiled, flared or notched, for example.

The spray head preferably has an approximately cylindrical shape in the radial direction (i.e. relative to the bore, which is ideally also cylindrical, or at least conforms to the configuration of the fluid conduit). The spray head may also be referred to as a spray head assembly due to at least two segments forming the body.

The segments may be moved into position and/or held together by a machine as part of an automated process that may also locate the fluid conduit between the segments before bringing them together to form the body of the spray head.

Preferably, the (at least two) segments are configured to be located around the (shaft of the) fluid conduit from the sides of the fluid conduit, for example from a generally radial or generally oblique direction.

Preferably, the segments are configured to locate (or be located) around the fluid conduit such that at least a portion of the fluid conduit is retained within the longitudinal bore. Preferably, the segments are configured to secure, within the longitudinal bore, around a (e.g. proximal or base) portion of the fluid conduit that is remote from the distal tip of the fluid conduit, preferably leaving the distal tip unsecured. The distal tip of the fluid conduit may then project along the bore to, or maybe even slightly beyond, the distal end face of the spray head.

Clamping the at least two segments of the body around the fluid conduit may also provide an additional opportunity for holding and manipulating pots, cartridges and the removing and replacement of tops and caps.

Preferably, the segments are arranged to form a substantially fluid-tight seal between the bore and at least a portion of the fluid conduit whereby to inhibit flow of the gaseous medium (and other fluid) along the outside of the fluid conduit, i.e. escaping back up through the body past the fluid conduit rather than exiting the spray head where intended. Thus, the clamping action may also be used to provide a substantially fluid-tight seal around the fluid conduit.

Preferably, the segments are separable along a (longitudinal) split line that is coaxial with the longitudinal bore. Preferably, the longitudinal bore is located generally at the centre of the body when the segments are combined to form the body (i.e. when the body is "assembled").

Preferably, each segment (or at least one of them) may comprise a radial projection, located on an inner surface of said part of the longitudinal bore, for engaging a distal portion of the fluid conduit within the bore, whereby to promote concentricity of the fluid conduit tip within the longitudinal bore. Preferably, the (or each) radial projection extends in a longitudinal direction along the inner surface of said part of the longitudinal bore, for example wherein the projection may be a longitudinal rib or fin. Thus, projections, such as radial fins or ribs, located within the bore may be provided to guide the tip (or end) of the fluid conduit to be concentric with the bore of the spray head. The projections can be attached to the spray head to guide the fluid conduit.

The body may be configured to define an annular gap at the distal end of the longitudinal bore, between the body and the distal tip of a fluid conduit received therein, through which the gaseous medium can be flowed thereby to direct said balanced flow of gaseous medium over the distal tip of the fluid conduit. The annular gap may be provided by a formation at the distal end of said part of the longitudinal bore on one of the segments, and the other(s) of said segments may be configured to receive the formation when the at least two segments are combined thereby to define the annular gap.

Alternatively, or additionally, projections may form part of, or be attached to, the fluid conduit itself to provide outer guide surfaces for the body segments to clamp against. The projections may be combined with a cylindrical sleeve, for example, to form the annular gap for gaseous medium to flow through. In such an arrangement, the end of the fluid conduit may also be locally restricted to form a fluid nozzle and help initiate atomisation in an air-assist process. Said fluid nozzle can, however, be used with or without the radial fins.

Preferably, the segments each define part of a, preferably annular, chamber within the body that is completely formed when the segments are combined (or brought together) to form the body, said chamber being in fluid communication with the distal end of the longitudinal bore (at the front or distal face of the body), preferably via said annular gap when provided therein.

Preferably, the chamber is further arranged to receive a flow of gaseous medium from an external source, preferably at a pressure of <0.1 MPa (i.e. 1 bar). The gaseous medium is preferably compressed air.

Typically, such air distribution chambers may be interconnected with a ring of gauge holes (or "ports"). In addition, one or more separate flows of air through the segments (in addition to the atomising air flow) may be controlled independently to refine or even advantageously distort the spray pattern. The fluid pressure to the feed line reservoir or inside the cartridge may be controlled directly, or generated by the movement of a piston, for example, to force the fluid through the fluid conduit. In such a manner, the spraying process can be controlled precisely for each of the three spraying processes: air atomisation, air-assist and airless.

Thus, preferably, at least one port is provided on a distal face of each of said at least two segments for ejecting a stream of gaseous medium from the body, said at least one port being in fluid communication with the chamber such that a gaseous medium can be flowed through said least one port to stabilise spray formed when fluid ejecting from the distal tip of a fluid conduit received within the longitudinal bore is atomised by another, different stream of gaseous medium. The ports may be angled to direct the stream of gaseous medium as required. Preferably, said at least one port comprises at least two (different) ports, each port having a different configuration, for example different shapes and/or diameters and/or location and/or angle.

Additionally, or alternatively, each segment preferably comprises a horn portion extending from an edge of each segment in a longitudinal directions, said horn portion having at least one horn port configured to direct a flow of gaseous medium across a (or the) distal face of the body whereby to flow form the atomised fluid into a desired shape, preferably a (substantially flat) fan shape. Preferably, the horn port is configured to direct the flow of gaseous medium at an angle <90 degrees relative to the axis of the cannula. Preferably, the flow of gaseous medium is supplied by an external source in direct fluid communication with each of said horn portion, for example via channel(s) extending through the body from the rear face to the front face (i.e. to the horn portion).

With only air flowing through the spray head from jets in its front face and through its shaping fan nozzles, the spray head stays substantially clean. Any drips that may form at the tip of the fluid conduit at the start and end of the spraying process can be directed away from the spray head by starting and ending the spraying process with the spray head pointing downward.

The present invention may also provide a kit of parts, comprising: a spray head as described herein; and at least one fluid conduit for providing a flow of fluid there through. Preferably, said at least one fluid conduit has a fluid reservoir connected thereto, for example wherein the fluid conduit and fluid reservoir comprise a cartridge, and preferably a syringe-type cartridge.

Also described is a method of using a spray head as described herein, the method comprising: providing a fluid conduit for delivering a flow of fluid (for example from fluid supply or reservoir connected thereto); providing a spray head comprising a body formed of at least two radially separable segments; and locating said (separated) segments of the body around the fluid conduit to form the (single) body of the spray head.

Preferably, the method further comprises clamping said at least two segments of the body to the fluid conduit to secure it within the longitudinal bore of the body. The at least two (separated) segments may be motivated by an automated actuator, which is configured to move the segments, to form (or "assemble") the body around the fluid conduit. In use, fluid is ejected from the distal tip of the fluid conduit while a gaseous medium is flowed through the body and past the distal tip to atomise the ejected fluid.

Also described herein is a fluid conduit in the form of a cannula for use with a spray head as described herein, the cannula comprising a hollow shaft having a proximal end adapted to be fluidly connected to a fluid supply and a distal end having a tip for ejecting fluid therefrom, wherein the distal tip is configured to condition fluid as it is ejected therefrom. The tip of the cannula may be substantially flattened across the diameter of the cannula (i.e. in a radial direction) such that fluid is ejected from an elongate slit. Furthermore, the cannula may comprise a plurality of separate (sub) cannulas that together form a "main" cannula for locating within the bore of the spray head. As such, different (e.g. coloured) fluids may be ejected from the main cannula without having to swap out the cannula. Each of said sub-cannulas maybe connected to a different spray fluid reservoir, which may be combined as a single syringe, for example.

As noted above, numerous advantages are provided by the present invention. For example, by clamping and releasing the fluid conduit around the sides of the fluid conduit, contamination of the bore can be inhibited, and maybe even avoided. Furthermore, by forming the body from at least two separable segments, the bore can be exposed for easy cleaning, if necessary. Additionally, by securing the fluid conduit from the sides (e.g. radially or obliquely), the fluid conduit does not need to be inserted through the body of the spray head, which therefore allows the fluid conduit to be different shapes, configurations and sizes, including straight, bent, conical, tapered, notched or profiled in cross-section and selected to best suit the application. For example, by enabling a fluid conduit tip to have a flattened profile, it can aid atomisation and help initiate the shaping of the spray. Once secured (e.g. clamped) within the body, high frequency vibrations (e.g. applied via ultrasonic transducer) can be applied to the cannula to help initiate atomisation within and from the end of the fluid conduit and reduce the air flow needed. By providing protrusions within the bore, concentricity of the fluid conduit within the bore can be improved.

In one example, a "syringe" type fluid reservoir may be loaded axially through the open face of the body of the spray head and ejected axially away from the body of the spray head. A plunger mechanism, for driving fluid from a cartridge of the syringe, may be adapted to grab the cartridge of the syringe internally and move it into and out of a further mechanism that holds the cartridge, in use. The cartridge may be loaded axially through the open face of the spray head and then retracted back into a desired position. The distal tip of the fluid conduit can then be clamped (and released) before it reaches the end face of the spray head (and the spray head bore). Thus, it is possible to ensure that the distal tip of the fluid conduit remains extending out beyond the end face of the spray head after the cartridge has been has already passed through the spray head.

A further aspect might be to form, or add, a medium to high pressure nozzle feature at the end of the fluid conduit thereby providing an advantageous air-assist function. Preferably, the separate airflows can be adjusted remotely to alter the atomisation and shaping processes.

The spray head can be used to pick from a group of feed lines each containing different coloured fluids, for example, and with a suitable fluid conduit already attached. Alternatively, or additionally, the spray head can spray a mixture of fluids from a combination of feed lines or cartridges through a plurality of fluid conduits at the same time. The resulting spray could be a multipack mixture of fluid and hardener passed through a static mixer or a blend or sequence of colours applied programmatically like printing.

Fluid is supplied directly to the fluid conduit from a fluid reservoir, such as a cartridge, which may be "syringe-like" in its form, and may come in a range of sizes for storing various types (e.g. different colours) and volumes of fluids. A cartridge can be readily filled, tested and resealed for subsequent testing. Alternatively, the cartridge can be discarded or cleaned and reused, with a quick turnaround and with minimal waste. Another option is for fluid to be supplied to the fluid conduit from a fluid reservoir via a fluid feed line connected there between. Other arrangements for supplying fluid to a fluid conduit are of course possible. Multiple fluid conduit can be provided, each having a different fluid, for example, for selective use with the spray head.

In a further aspect, the plunger (or piston), of a cartridge comprising a plunger to drive the fluid contained therein, may be equipped with an expanding bellows, or similar feature, arranged to grab the cartridge internally thereby to pick it up. By maintaining a gentle stream of air while the spray head is being separated while the cartridge is held by the plunger, the outside of the fluid conduit can also be blown clean. Capping the fluid conduit, or removing the fluid conduit and capping the cartridge, will stop the fluid from drying in the end between tests. Alternatively, the cartridge may simply be dropped and discarded before a new one is loaded into the spray head.

As mentioned above, the clamping action can also be used for holding and manipulating pots, cartridges, tops and caps.

In a further embodiment, where the fluid conduit is a nozzle or can be formed into a nozzle, such as a conical nozzle, e.g. where the cross-section of the nozzle changes in a linear manner as it moves towards the tip, the clamping action can be used to alter the "nozzle" geometry of the spray head, and adapt the atomisation and shaping processes in response to changes in the fluid properties, environmental conditions or spray requirements.

The clamping action can also be used to mechanically seal the fluid tip eliminating drip formation and stopping the fluid from being exposed, drying and blocking the fluid conduit.

As used herein, the terms "proximal" and "distal", for example in relation to the longitudinal bore or fluid conduit, are used with reference to a fluid reservoir (e.g. a syringe) from which the fluid conduit is fed fluid.

As used herein the "front face" connotes a face (or side) of the body from which fluid is ejected for atomisation, and the "rear" face connotes an opposing face (or side) of the body that is connected, in use, to the air supply, for example. The front face may also be considered to be a distal face, with the rear face being proximal face.

FIGURES

An exemplary embodiment of the present invention will now be described with reference to the following figures, in which.

DETAILED DESCRIPTION

Figure 1B:
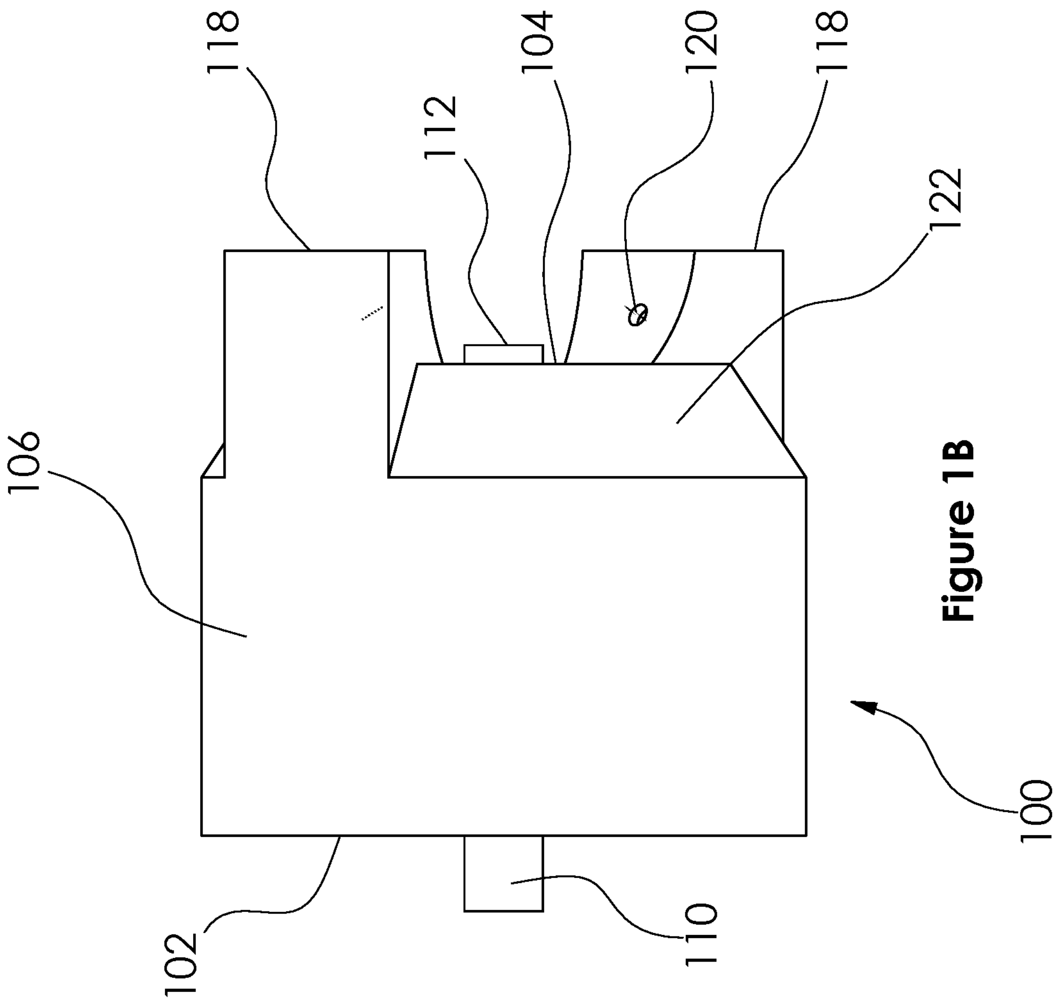
FIGS. 1A and 1B show a proximal end view and a side view of a spray head according to a first aspect.

In the following description and accompanying drawings, corresponding features of different embodiments are, preferably, identified using corresponding reference numerals.

Figure 1A:
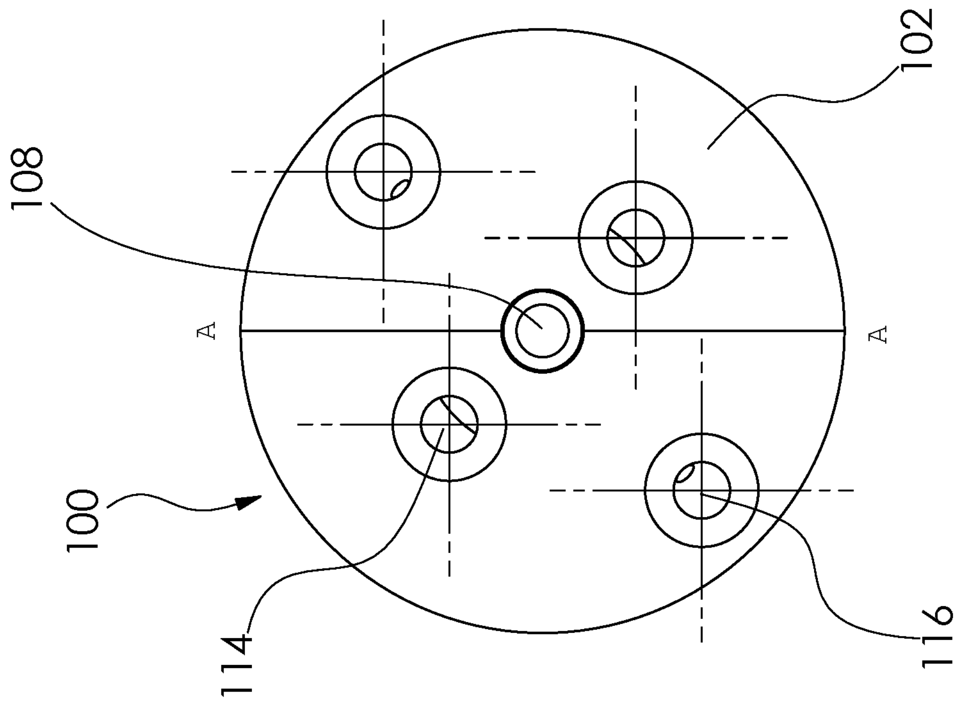

FIGS. 1A and 1B shows an embodiment of the spray head 10 according to a first aspect. A view of the rear end face 102 is shown in FIG. 1A with a side view being shown in FIG. 1B where both the rear end face 102 and a front face 104 can be seen.

The spray head 10 comprises a generally cylindrical body 100 having a side wall 106 extending between the rear face 102 and front face 104. A centrally located bore 108 extends through the spray head 10 in a longitudinal direction. As such, the bore may be described as a longitudinal bore 108. A fluid conduit 110 extends through the bore 108, as can better be seen in FIG. 1B. Although not shown, it will be understood that the fluid conduit 110 is fluidly connected to a suitable fluid reservoir, which supplies to the fluid conduit 110 the fluid that is atomised into a spray, in use.

In this first aspect, the fluid conduit 110 is in the form of a cannula, though in other aspects the fluid conduit 110 may be a conical nozzle, for example, as will be discussed further on.

The cannula 110 extends through the body 100 towards the front face 104, where the cannula ends in a cannula tip 112. In use, fluid from the fluid reservoir is flowed through the cannula 110 in a direction moving from the rear face 102 of the body 100 towards the front face 104, where it is ejected out of the distal tip 112 of the cannula 110.

Two pairs of ports 114, 116, as shown on the rear face 102, are provided for supplying gaseous medium to the front face 104 for atomising the fluid as it is ejected from the cannula tip 112, and controlling the resulting spray. The gaseous medium is preferably supplied at a pressure less than 1 MPa (i.e. 1 bar). The gaseous medium is preferably air, and for convenience will generally be referred to as such herein.

Figure 2:
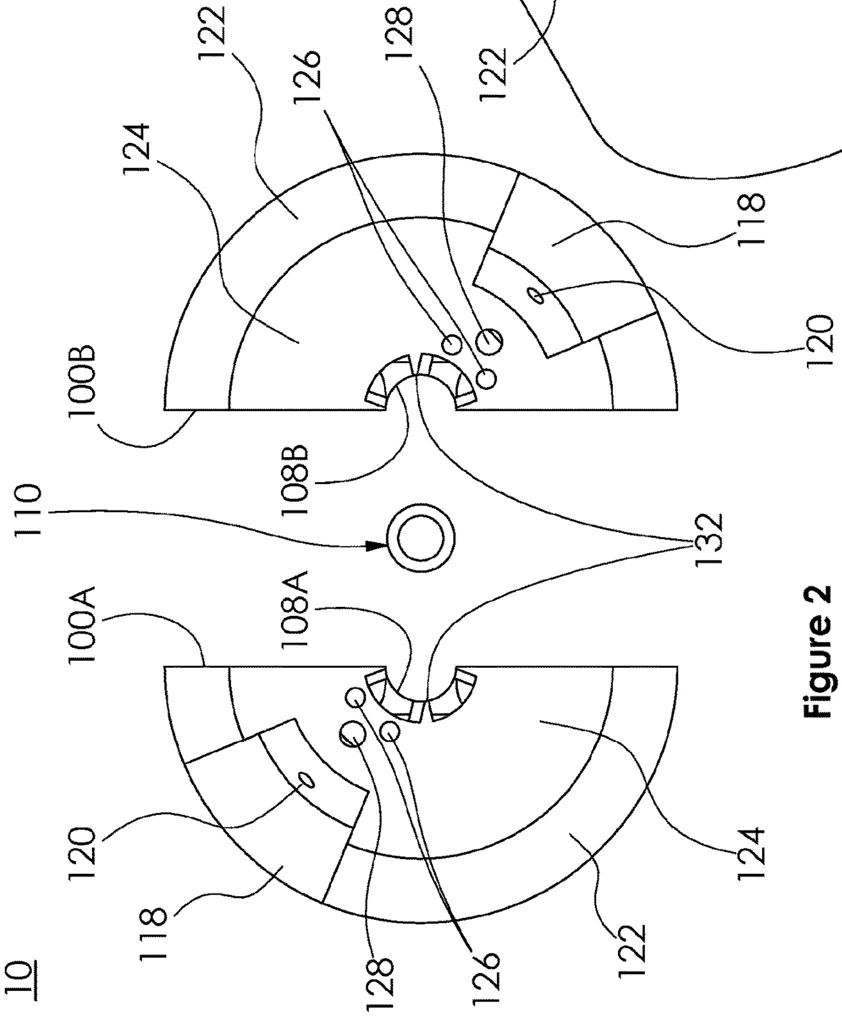
FIG. 2 shows a front view of the segments that form the spray head of FIG. 1 being located around a fluid conduit in the form of a cannula according to the first aspect.

The first pair of ("atomising air") ports 114 are arranged to supply air for atomisation of the fluid, and are fluidly connected to an annular chamber 132 within the body 100, as will be explained in more detail further on (e.g. see FIG. 2). The second pair of ("fan air") ports 116 are arranged to supply air for controlling the resulting spray.

As can be seen in FIG. 1B, the front face 104 of the spray head is provided with a pair of opposing horns 118. Each horn 118 has one or more air outlets 120 (or "fan jets") that are fluidly connected to one of the pair of fan air ports 116 on the rear face of the spray head 100. The air outlets 120 are angled inward, generally towards each other, such that air supplied to the air outlets 120 via the second ports 116 flows across the front face 104, thereby controlling the shape of the resulting spray of atomised fluid ejected from the cannula tip 112. The portions 122 of the front face 104 that extend between the horns 118 are, preferably, chamfered inward. If the portions 122 are chamfered, they help to allow surrounding air, which is drawn in during a spraying operation, to flow smoothly over the front face 104 of the body 100 without creating a negative pressure on adjacent surfaces that might otherwise cause ejected fluid to be pulled back onto those adjacent surfaces and drying. A central portion 124 of the front face 104 is both circular and generally flat.

Figure 3:
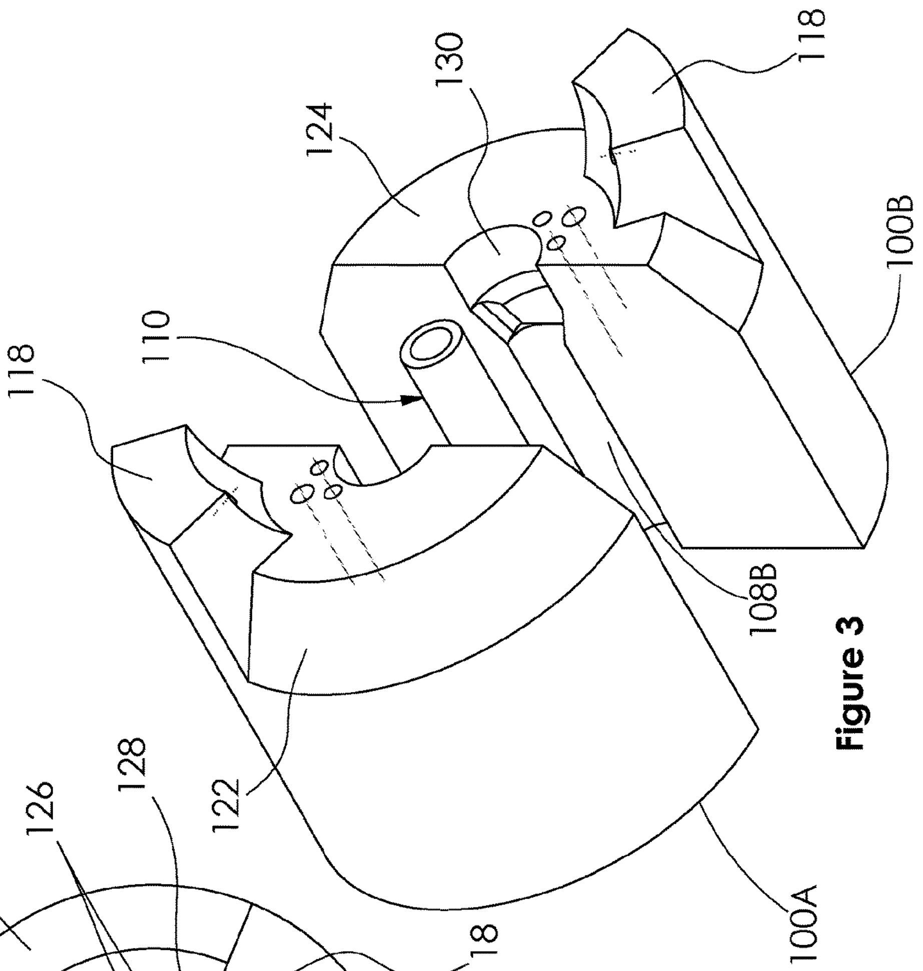
FIG. 3 shows a perspective view of the segments that form the spray head in FIG. 2 according to the first aspect.

The body 100 is formed of two segments 100A, 100B, which are separable along a "split line" A-A shown in FIG. 1A. As further shown in FIGS. 2 and 3, the body 100 of the spray head 10 can be formed, and preferably clamped, around a cannula 110, shown aligned between the two segments 100A, 100B, such that this fluid conduit is received, and preferably secured, within the bore 108 that is formed when the two segments 100A, 100B are combined. Each body segment 100A, 100B therefore defines part 108A, 108B of the bore 108. In other words, ideally, no single segment 100A, 100B of the body 100 defines a complete section of the bore 108. The bore 108 is thereby configured to conform to the shape of the fluid conduit for which the spray head 10 is to be used, which in this first aspect is a cannula 110.

Two sets of further air outlets (or "stabilising jets") 126, 128 are provided on each body segment 100A, 100B for further stabilising and conditioning of the resulting spray from the atomised fluid, in use. These further air outlets 126, 128 are also fluidly connected to the annular chamber 132 in the body 100, mentioned above, which will be described further on.

The two segments 100A, 100B in this first aspect are designed and configured such that, when they are brought together (or "combined") around a cannula 110 to form the complete body 100, a proximal end of the cannula 110 is clamped (i.e. "secured") between them such that the distal tip 112 remains unsecured. Furthermore, a distal portion of the bore 108 is configured to widen in the location of the distal cannula tip 112 (i.e. the tip of the fluid conduit) such that an annular gap (or "air passage") 130 is provided around the secured cannula 110. In use, air from the annular chamber 132 (not shown), which is fed by the port 114 in the rear face 102 of the body 100, is flowed through the annular gap 130 to atomise fluid ejecting from the cannula tip 112.

While an annular gap 130 is used in this example, other configurations for directing a balanced flow of air over the distal tip 112 of a fluid conduit 110 are possible. Alternatives might include a series of regularly spaced ports that surround the fluid conduit 110, or a helical flow path configuration, for example.

Radial projections 132 are provided on the inner wall of the bore 108, on each body segment 100A, 100B, in this example in the portion of the bore 108 that is widened to provide the annular gap 130, to help stabilise the unsecured cannula tip 112 and ensure that it is concentric within the bore 108. The radial projections 130 extend inwards and may also extend longitudinally along the wall of the bore 108.

Figure 4:
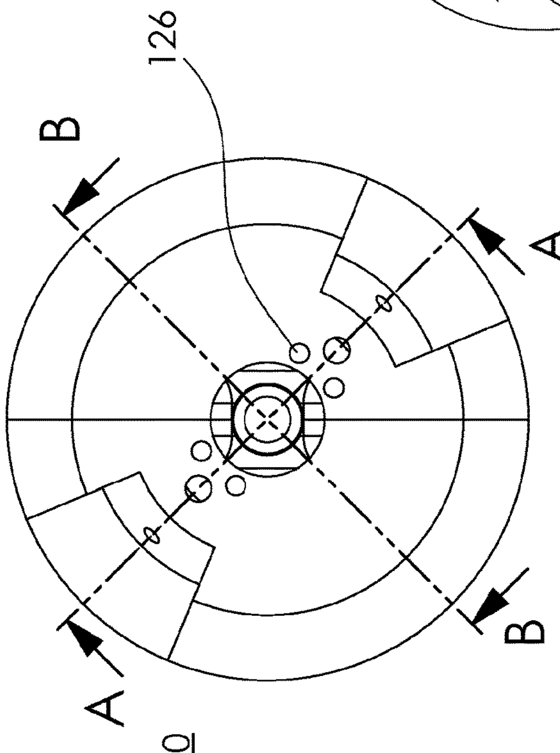
FIG. 4 shows a front end face of the spray head according to the first aspect.
Figure 5B:
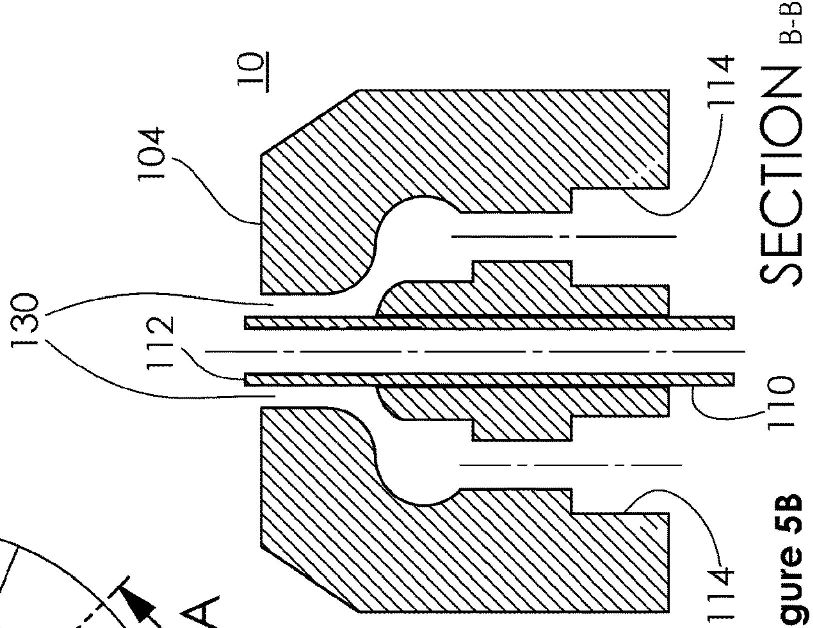
FIGS. 5A and 5B show sectional side views of the spray head of FIG. 4, axially rotated through 90 degrees, respectively, according to the first aspect.
Figure 5A:
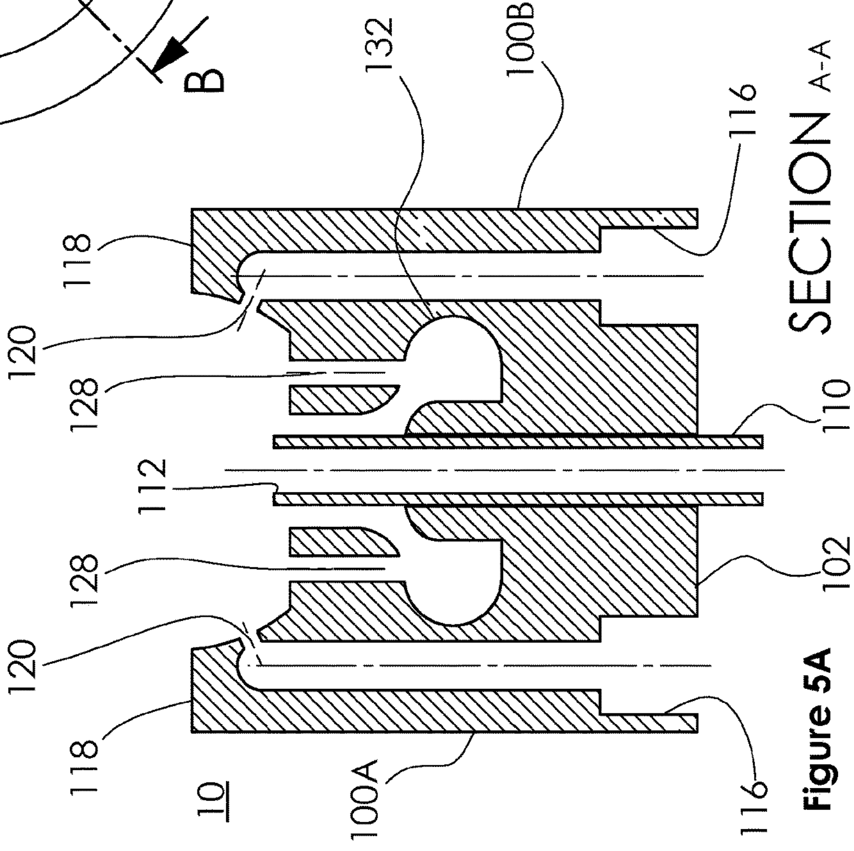

Another view of the front face 104 of the spray head 10 is shown in FIG. 4, with sections A-A and B-B indicated which are shown in FIGS. 5A and 5B, respectively.

Section A-A, in FIG. 5A, is a sectional view through the body 100 that passes through the fan jets 120 in the horns 118 and the stabilising jets 128 provided on the front face 104 of the spray head 10.

This view shows the annular chamber 132 mentioned above, which is (also) formed when the two segments of the body 100 are combined. Thus, each of the boy segments 100A, 100B defines part of the annular chamber 132. The annular chamber 132 is supplied with air from the atomising air port 114 on the rear face of the body 100, as can be seen in Section B-B of FIG. 5B. In turn, the annular chamber 132 supplies air to both sets of stabilising jets 126, 128, and, importantly, also through the annular gap 130 between the unsecured distal tip 112 of the cannula 110 and the bore 108 for atomising fluid ejected from the distal tip 112.

It can also be seen in Section A-A how air may be supplied from the fan air ports 116 in the rear face 102 to the fan jets 120 in the horns 118. By using a suitable valve to control the flow of air to the horn 118, the shape of the spray may be controlled. If no air is flowed from the fan jets 120, then a circular spray is produced due to the lack of "squeeze" effect provided by the fan jets 120.

Section B-B, in FIG. 5B, is a sectional view through the body 100 that passes through the atomising air ports 114 shown in the rear face 102 of the body 100. As mentioned above, it can be seen how air is supplied to the annular chamber 132 from the atomising air ports 114 via fluid conduits that connect there between.

In both FIGS. 5A and 5B, it can clearly be seen how a distal part of the cannula 110 is secured in the bore 108 between the two segments of the body 100, with the distal tip 112 of the cannula 100 left unsecured. In this embodiment, the tip 112 extends just past the front face 104 of the body 100, but in other embodiments it could be secured within the body 100 such that it is approximately flush with the front face 104.

Figure 6:
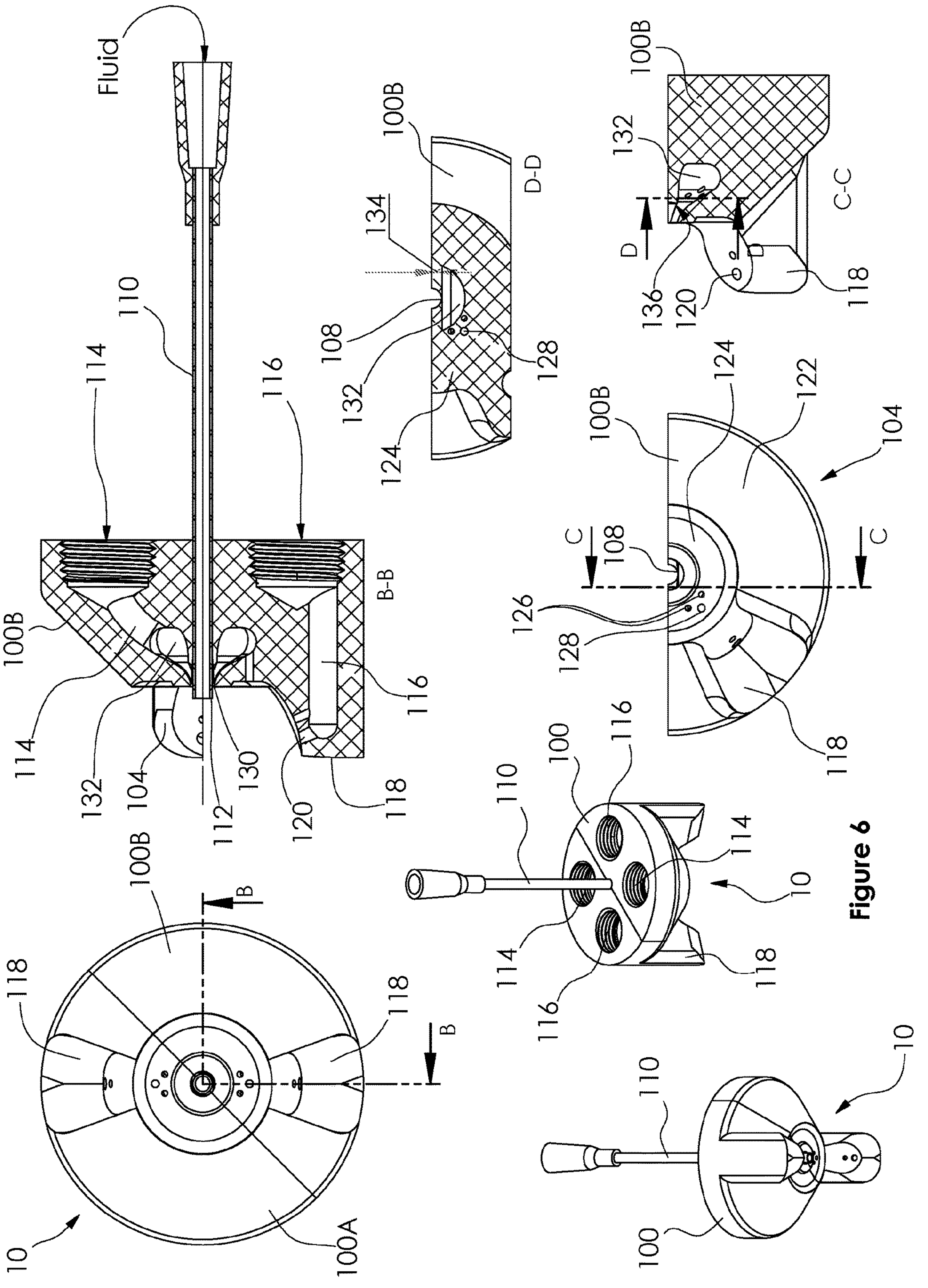
FIG. 6 shows various illustrative views of the spray head and fluid conduit according to the first aspect.

FIG. 6 shows various sectional views of a spray head 10 to assist with visualising the present invention. The body 100 of the spray head 10 can be seen both with a cannula 110 (i.e. the fluid conduit) received within the bore (not visible) of the assembled body 100, in particular sectional view B-B, and also without said fluid conduit received in the body 100, in particular sectional views C-C and D-D, such that the annular chamber 132 and its particular configuration within the body 100 can be better understood.

In sectional view B-B, the annular chamber 132 that is formed when the segments are brought together is clearly visible, as are the atomising air ports (and their connecting channels) 114 and the jet air ports (and their connecting channels) 116.

In sectional views C-C and D-D, it can be seen that, in this example, each body segment 100A, 100B comprises a wall portion 134 that extends from the annular chamber 132 to the front face 104 of the body 100, adjacent the (portion of the segment 100A, 100B that defines the) bore 108. The central portion 124 of the front face 104 comprises a chamfered "wall" portion 136 that extends away from the annular chamber 132, and is chamfered to slope upwards towards the front face 104. The chamfered wall portion 136 directs the airflow inward towards the fluid being ejected from the distal tip 112 of the cannula 110 for more effective atomisation.

The atomisation of fluid is performed in a manner well-known in the state of the art. The present invention allows the spraying process to be automated such that the two segments 100A, 100B of the body 100 are motivated by a machine (e.g. actuator) to be secured around a fluid conduit that is fluidly connected to a cartridge, syringe, feed line or other suitable fluid supply to form the complete spray head 10. The spray head 10 can then be operated automatically by the machine.

Figure 7:
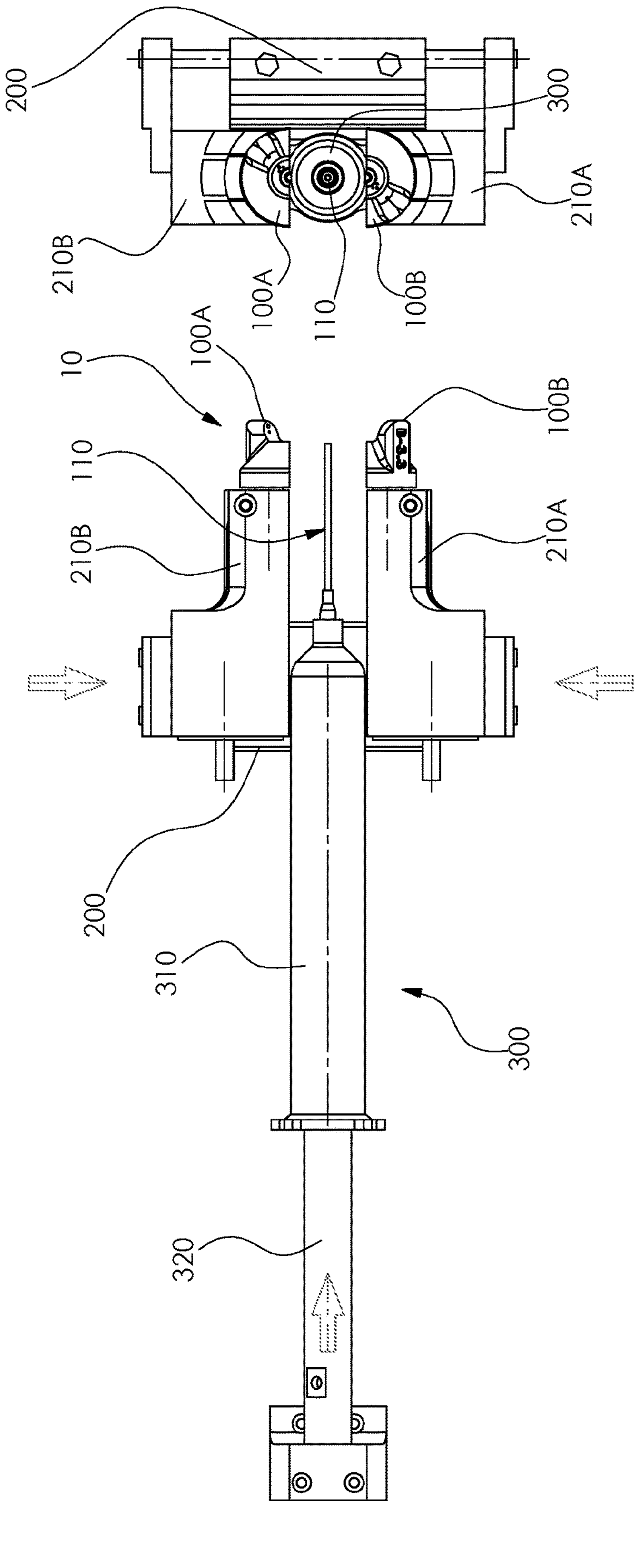
FIG. 7 shows side and front end views of the spray head mounted to an actuator and a "syringe" cartridge having a fluid conduit in the form of a cannula according to the first aspect.

FIG. 7 shows an example of such an arrangement, in which a spray head 10 comprises two separable segments 100A, 100B that are each mounted to moveable fingers 210A, 210B, respectively, of an actuator 200. The actuator fingers 210 are arranged to be motivated by the actuator 200 to move between open and closed positions, whereby to separate or assemble the spray head, respectively.

In this example, a "syringe" type fluid reservoir 300 provides a supply of fluid to an attached cannula 110 (i.e. fluid conduit). The syringe 300 comprises a cylindrical cartridge 310 that acts as a fluid reservoir, and a plunger (or piston) mechanism 320 deployed within the cartridge 310 that is moveable relative to the cartridge 310 to drive fluid out through the cannula 110 that is fluidly connected to 310.

The plunger mechanism 320 may be used to grab the cartridge 300 of the syringe 310 internally and thereby move it into and out of the actuator (or mechanism) 200 that holds the cartridge 310, in use. A rubber sleeve (e.g. bellows, not shown) may be provided at the distal tip of the plunger mechanism 200, which can be expanded under air pressure to grip the interior walls of the cartridge 310 of the syringe 300 internally to secure the cartridge 300 to the plunger mechanism 200, for example where the plunger mechanism 200 enters just inside the cartridge 310.

Extended travel of the plunger mechanism 200 can carry the syringe 300 out through the open end face of the body 100 of the spray head 10. The plunger mechanism 200 (i.e. carrying the cartridge 310) can then be retracted to a position between the clamping mechanism 200 whereby it stops before the tip of the fluid conduit 110 reaches the end face of the spray head 10. The distal tip of the fluid conduit 110 can thus be clamped and released between the body segments 100A, 100B before it reaches the end face of the spray head (and the spray head bore 108) such that the distal tip of the fluid conduit extends out beyond the end face of the spray head 10.

When the actuator 200 is controlled to close the actuator fingers 210, they are brought together around the cartridge 310 of the syringe 300, thereby securing it between the fingers 210. At the same time, the two segments 100A, 100B of the spray head 10 are brought together (i.e. located) around the cannula 110 to form the complete (i.e. assembled) body 100, thereby securing the cannula 110 within the longitudinal bore (not visible) that is formed within the body 100 as a result of the two segments 100A, 100B coming together. The extent to which the cannula 110 protrudes or extends from the front face of the spray head 10 can be controlled by the position that the syringe 300 is located within the fingers 210.

An advantage of such an arrangement is that a plurality of cartridges may be arranged in racks in a robot cell, which the machine can use interchangeably simply by clamping the spray head body 100 to the fluid conduit of a desired cartridge and operating it to generate fluid spray, and then swapping the cartridge out for another one simply by returning the used cartridge to the rack and releasing the fluid conduit of the cartridge, and then securing the body 100 to the fluid conduit of a different cartridge. Similarly, multiple feed lines may be arranged in racks in a robot cell, similar to fuel lines at a fuel (or "gas") pumping station, and the respective pump triggered when a particular feed line is selected for use by the robot.

Alternatively, the body 100 may be hand-assembled to the fluid conduit of a desired cartridge, or similar, and hand-operated. In this arrangement, a simple clamping mechanism (not shown), such as a toggle clamp (e.g. a mole wrench), may be secured or clamped around the separable segments of the body 100 when combined, to prevent them from separating and releasing the fluid conduit, in use. In this embodiment, a battery operated screw might control movement of a piston within the cartridge to provide a flow of fluid to the fluid conduit and an electric turbine might provide a stream of air through the body 100.

Figure 8A:
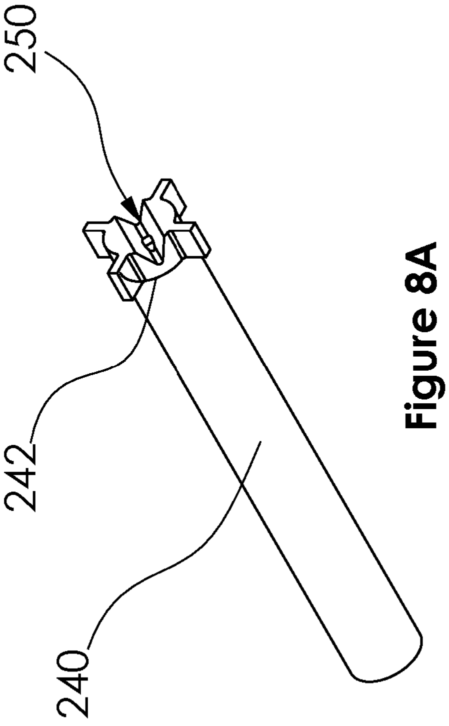
FIGS. 8A to 8C show perspective views of three different types of cannulas that can be used as fluid conduits with the spray head according to the first aspect.
Figure 8C:
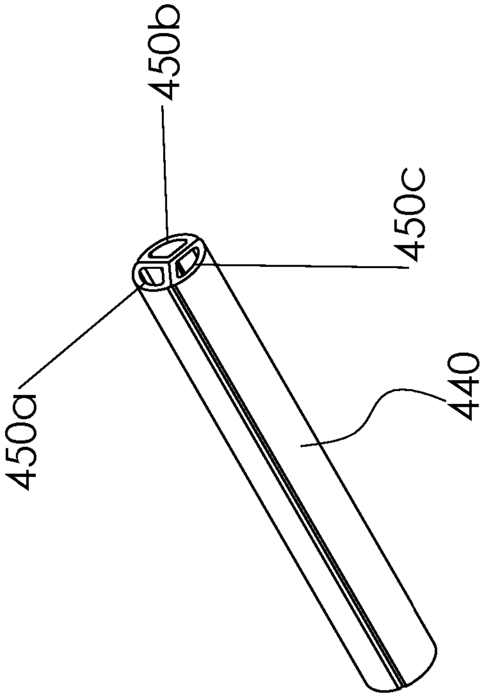
Figure 8B:
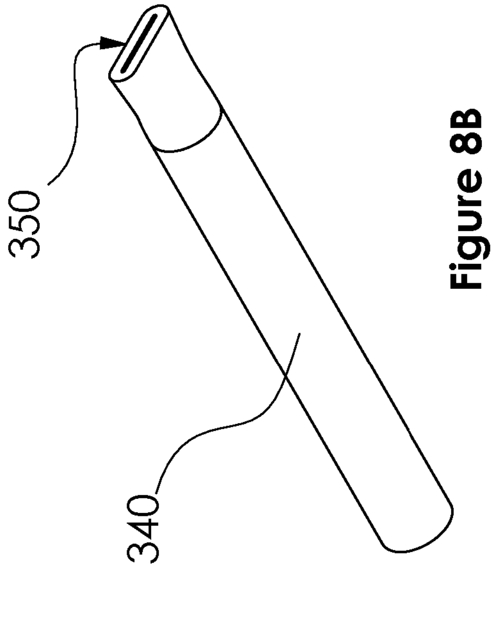

FIGS. 8A to 8C show examples of three different types of cannula 240, 340, 440, which may be used with a spray head 10 as described herein.

In FIG. 8A, an insert 250 is shown inserted into the tip 242 of the cannula 240. The insert 250 has radial fins and/or a fluid nozzle to atomise the fluid as it is ejected from the distal tip 112 of the cannula 240 and enters the atomising air stream. The radial fins can help to ensure that the unsecured tip 242 of the cannula 240, when received within the bore 108 of the spray head 10, remains concentric with the bore 108. Such an insert 250 may be useful for an "air-assist" function.

FIG. 8B shows a cannula 340 having a flattened tip 350, which can be used to generate a spray having a particular desired shape. Furthermore, forcing the fluid through this confined space helps both to atomise and shape the fluid spray.

FIG. 8C shows a cannula 440 that contains three smaller "sub" cannulas 450*a*, 450*b*, 450*c*. For example, if fluidly connected to a cartridge having three separate fluid chambers having separate pistons for selectively driving fluid from each chamber, or indeed three different cartridges or three separate feed lines, the sub-cannulas 450*a*, 450*b*, 450*c* can each be fluidly connected to a respective fluid chamber such that multiple fluid sprays can be generated on demand, without having to swap out the cannula 440. In this way, different coloured fluids may be provided via different fluid lines or an array of cartridges with suitably bent cannulas, for example, via the single cannula 410 held retained within the spray head body 100. A static mixing tube (not shown) for mixing fluid and hardener at the last moment before spraying could also be used.

Figure 9:
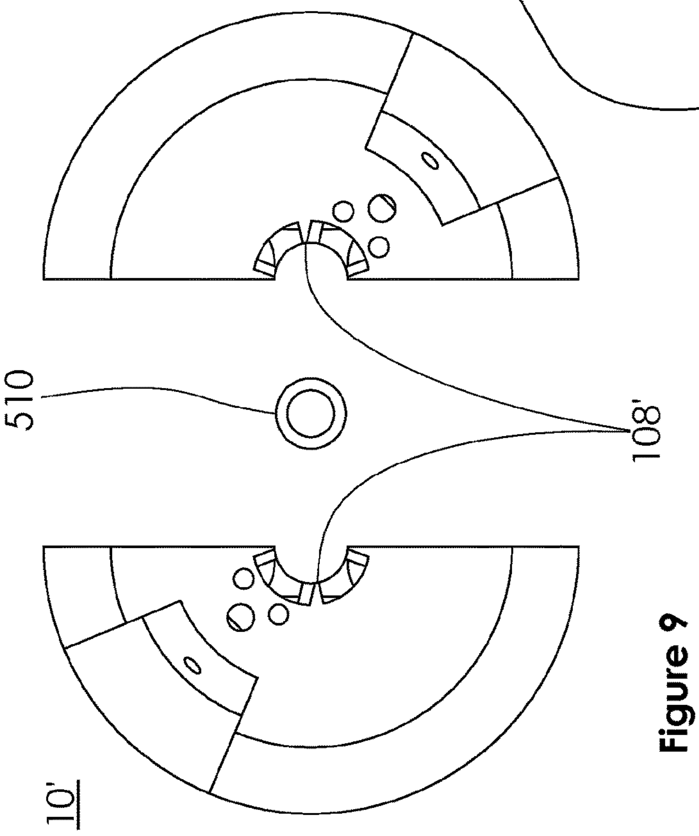
FIG. 9 shows a front view of the segments that form a spray head being located around a fluid conduit in the form of a conical nozzle according to a second aspect.
Figure 10:
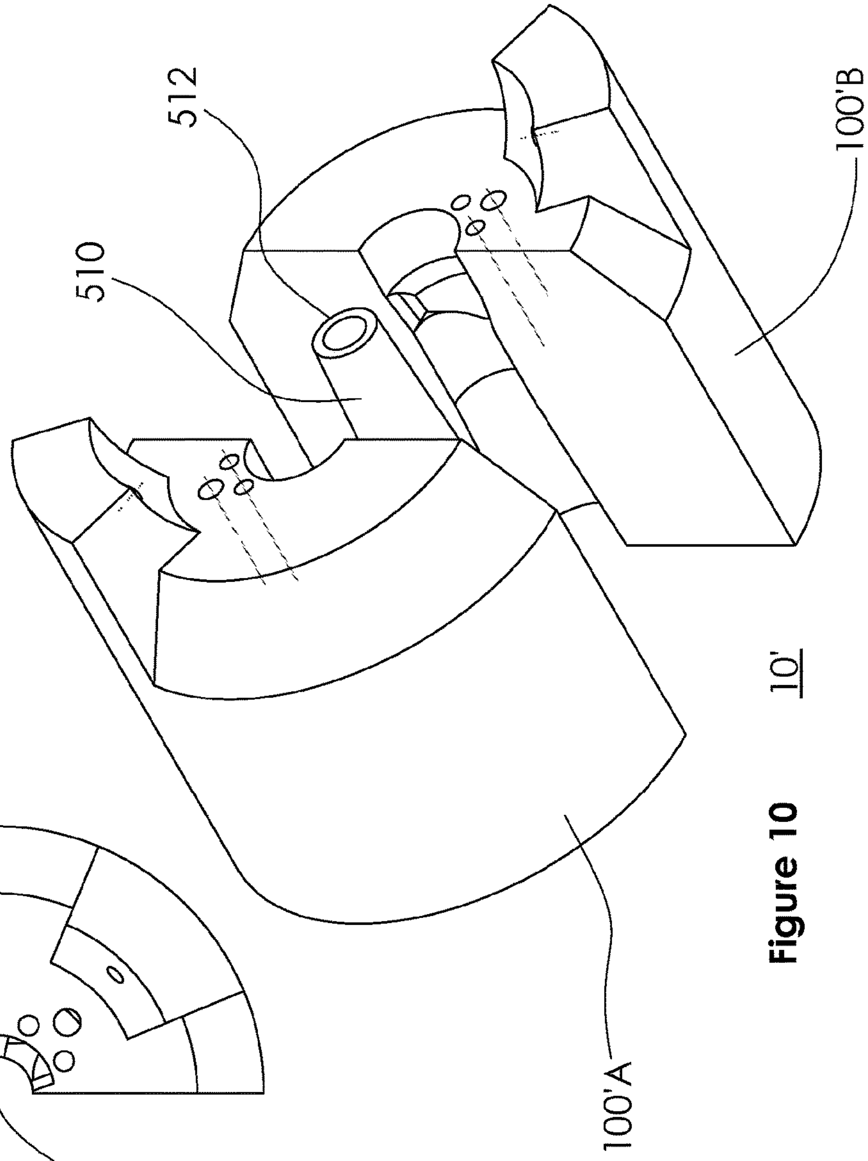
FIG. 10 shows a perspective view of the segments that form a spray head according to the second aspect.

FIGS. 9 and 10 show a spray head 10' according to a second aspect, which is configured for use with a fluid conduit in the form of a nozzle 510, and preferably a conical (or tapered) nozzle. As described above for FIG. 2 and FIG. 3, the body 100' is formed of two separable segments 100'A, 100'B, which are shown aligned with a conical nozzle 510 around which body 100' of the spray head body 10' is formed. As with the first aspect described above, the bore 108' is configured to conform to the shape of the fluid conduit for which the spray head 10 is to be used, which in this first aspect is a conical nozzle 510. Other than having a different configuration, which is specific for the particular fluid conduit 510 for which it is to be used, the spray head 10' of the second aspect is essentially the same as the spray head 10 of the first aspect described above, and as such there is no need to describe it in detail again here.

Figure 11:
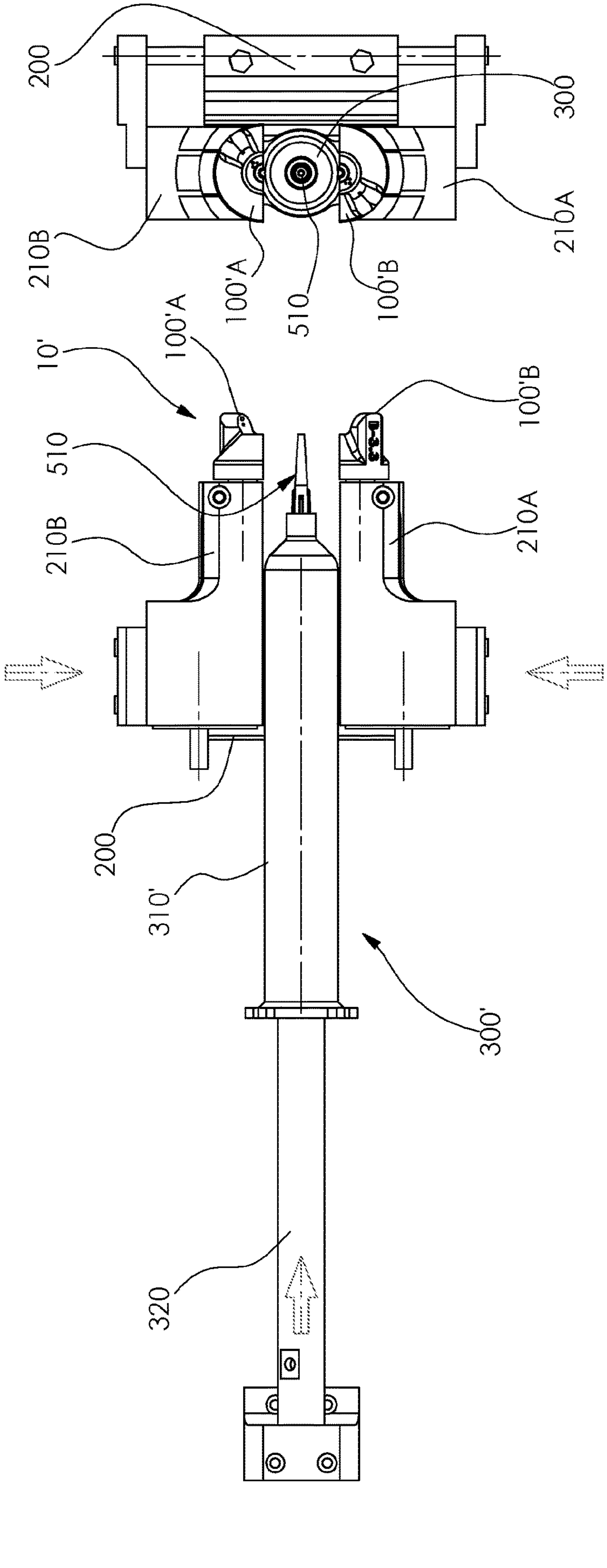
FIG. 11 shows side and front end views of a spray head according to a second aspect, having a fluid conduit in the form of a conical nozzle, mounted to an actuator and a "syringe" cartridge.

FIG. 11 shows an example of an arrangement by which a spray head 10' according to the second aspect can be operated automatically by a machine, similar to what is shown in FIG. 7 and described above. Again, as the majority of features are common to both arrangements, there is no need to describe them again in detail here. As shown, the second aspect differs in that the fluid conduit 510, which is fluidly connected to the cartridge 310' of the syringe 300', is in the form of a conical nozzle, and the shape of the longitudinal bore of the formed body 100' is therefore adapted or configured accordingly to correspond with the shape of the nozzle 510.

Figure 13:
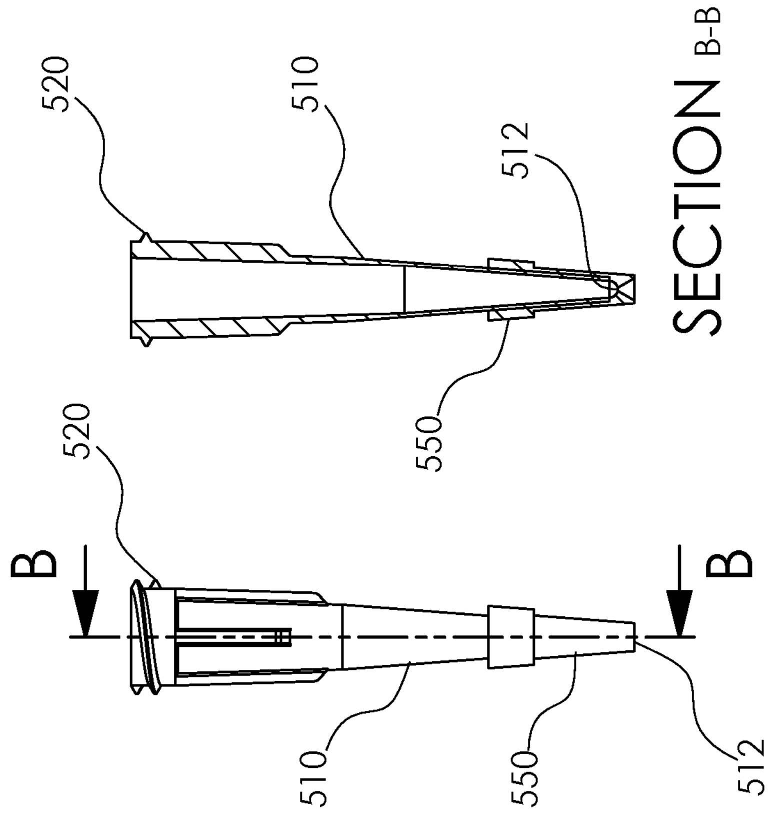
FIG. 13 shows external and sectional side views of a fluid conduit in the form of a conical nozzle according to a second example.
Figure 12:
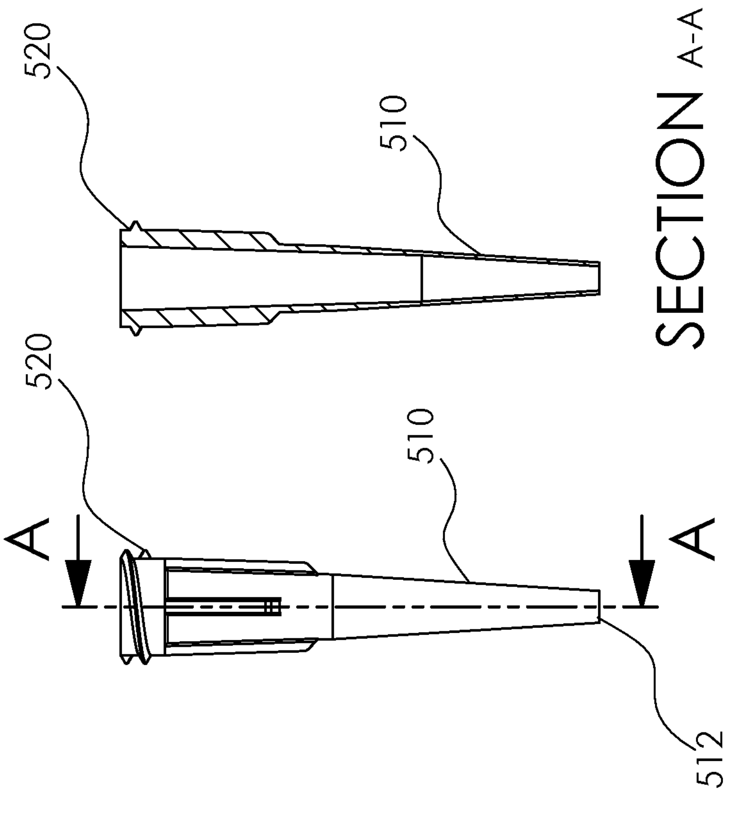
FIG. 12 shows external and sectional side views of a fluid conduit in the form of a conical nozzle according to a first example.

FIGS. 12 and 13 show two examples of fluid conduits configured as conical nozzles 510 for use with the spray head 10' according to the second aspect.

FIG. 12 shows a generally conical (or tapered) nozzle 510. The nozzle 510 is configured to have a Luer lock 520 connection with the cartridge 310' of a syringe 300'. The nozzle 510 needs to project the outlet for the fluid into the atomising airflow away from the reservoir volume, for example the cartridge 310' of a syringe 300'. A conical 510 nozzle reduces the pressure drop along its length, thereby reducing the force required to be applied to move the plunger mechanism 320 for efficient atomisation of the fluid at the orifice 512. The shape of the nozzle 510 creates an acceleration profile in the fluid and characterises the exit velocity. The flow profile imparts shear induced viscosity changes to the fluid prior to atomisation. The shape of the nozzle 510 can be adjusted to suit the fluid's rheology, the required condition on exit and the loading on the mechanism that deploys the fluid (e.g. the plunger mechanism 320 which is inserted into the cartridge 310' of a syringe 300' to deploy the fluid contained therein, and optionally to move the cartridge 310' into position).

FIG. 13 shows the nozzle 510 of FIG. 12 having a wear resistant tip 550, which may be either moulded as one piece with the nozzle 510 or provided as a separate attachment. As the change in cross-section becomes more abrupt, the nozzle 510 may wear too quickly. In this case, the wear resistant tip 510 can be added to, or moulded into, the nozzle 510. In the extreme, tips 550 with very small restriction diameters require high pressures which can initiate fluid atomisation at the "pinch point", orifice or at the exit, with or without air assistance (e.g. "air-mix" or "airless" systems).

In other examples, the nozzle may have a bayonet or screw fitting, for example, to secure it to the cartridge 310'.

It will be understood that the two aspects described above are provided purely by way of example, and alternative configurations and modifications of detail can be made within the scope of the invention. For example, any feature in a particular aspect described herein may be applied to another aspect, in any appropriate combination.

It should also be appreciated that particular combinations of the various features described and defined in any aspects described herein can be implemented and/or supplied and/or used independently. Furthermore, it should be noted that any apparatus feature described herein may also be provided as a method feature, and vice versa.

What is claimed is:

1. A spray head for atomizing a fluid ejected from a fluid conduit, the spray head comprising:

a body having a longitudinal bore for receiving the fluid conduit such that a distal tip of the fluid conduit extends outwardly from a distal end of the longitudinal bore, and one or more outlets configured to direct a balanced flow of gaseous medium over the distal tip of the fluid conduit, when received within the longitudinal bore, so as to initiate atomization of the fluid as it is ejected from the distal tip of the fluid conduit, wherein the body comprises at least two body segments that are separable in a radial direction relative to the longitudinal bore of the body, each of which defines a part of the longitudinal bore, said body segments when combined forming said body having said longitudinal bore, whereby the fluid conduit is received within the longitudinal bore by clamping said at least two body segments around the fluid conduit such that a portion of the fluid conduit is retained within the bore, and wherein the body segments are arranged to form a fluid-tight seal between the bore and at least a portion of the fluid conduit whereby to inhibit a flow of the gaseous medium along the outside of the fluid conduit.

2. The spray head of claim 1, wherein said at least two body segments are configured to locate around the fluid conduit from at least two sides of the fluid conduit, from a generally radial or generally oblique direction.

3. The spray head of claim 1, wherein said at least two body segments are configured to:

locate around the fluid conduit such that at least the portion of the fluid conduit is retained within the longitudinal bore; and secure, within the longitudinal bore, said portion of the fluid conduit, which is remote from the distal tip of the fluid conduit, thereby leaving the distal tip unsecured.

4. The spray head of claim 1, wherein said at least two body segments are separable along a split line that is coaxial with the longitudinal bore.

5. The spray head of claim 1, wherein the longitudinal bore is located generally centrally in the body when the at least two body segments are combined to form the body.

6. The spray head of claim 1, wherein each of said at least two body segments comprises a radial projection, located on an inner surface of said part of the longitudinal bore defined by each respective body segment, for engaging a distal portion of the fluid conduit within the bore.

7. The spray head of claim 6, wherein the radial projection extends in a longitudinal direction along the inner surface of said part of the longitudinal bore.

8. The spray head of claim 1, wherein:

the body is further configured to define an annular gap at the distal end of the longitudinal bore, between the body and the distal tip of a fluid conduit received therein, through which the gaseous medium can be flowed thereby to direct said balanced flow of gaseous medium over the distal tip of the fluid conduit; and said annular gap is provided by a formation at the distal end of said part of the longitudinal bore on one of said at least two body segments, and the other of said at least two body segments is configured to receive the formation when the at least two body segments are combined thereby to define the annular gap.

9. The spray head of claim 1, wherein the at least two body segments each define part of an annular chamber within the body that is completely formed when the at least two body segments are combined to form the body, said chamber being in fluid communication with the distal end of the longitudinal bore.

10. The spray head of claim 9, wherein:

the chamber is further arranged to receive a flow of gaseous medium from an external source at a pressure of less than 0.1 MPa; and the gaseous medium is compressed air.

11. The spray head of claim 9, further comprising at least one port provided on a distal face of each of said at least two body segments for ejecting a stream of gaseous medium from the body, wherein said at least one port comprises at least two ports, each having a different configuration and each in fluid communication with the chamber.

12. The spray head of claim 1, wherein each of said at least two body segments further comprises a horn portion extending from an edge of each body segment in a longitudinal direction, said horn portion having at least one horn port configured to direct a flow of gaseous medium across a distal face of the body whereby to form the atomized fluid into a desired shape.

13. The spray head of claim 12, wherein the horn port is configured to direct the flow of gaseous medium at an angle of less than 90 degrees relative to a longitudinal axis of the fluid conduit.

14. The spray head of claim 12, wherein said flow of gaseous medium is supplied by an external source in direct fluid communication with each of said horn portion.

15. The spray head of claim 1, wherein the fluid conduit is configured as a cannula comprising a hollow shaft with substantially parallel walls.

16. The spray head of claim 1, wherein the longitudinal bore is adapted to receive a fluid conduit configured as a nozzle having a conical or tapered configuration.

17. A kit of parts, comprising:

at least one fluid conduit for providing a flow of a fluid; and a spray head according to claim 1.

18. A kit of parts according to claim 17, wherein said at least one fluid conduit has a fluid reservoir connected thereto, such that the fluid conduit and the fluid reservoir form a cartridge.

19. A method of using the spray head according to claim 1, the method comprising:

providing said fluid conduit for delivering a flow of said fluid; and clamping the body segments around the fluid conduit in a radial direction relative to the longitudinal bore to form the body of the spray head, wherein the fluid conduit is received within the longitudinal bore defined within the body such that the distal tip of the fluid conduit extends outwardly from the distal end of the longitudinal bore, such that the balanced flow of gaseous medium can be directed by the one or more outlets of the body over the distal tip of the fluid conduit so as to initiate atomization of the fluid as it is ejected from the distal tip of the fluid conduit.

* * * * *